July 10, 1928.
W. L. BRYANT
MICROMETER GAUGE
Filed Nov. 18, 1922  4 Sheets-Sheet 1
1,676,248
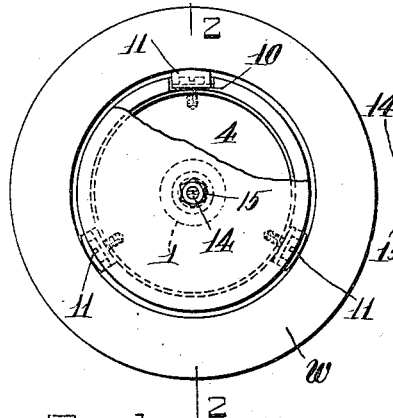
Fig.1.
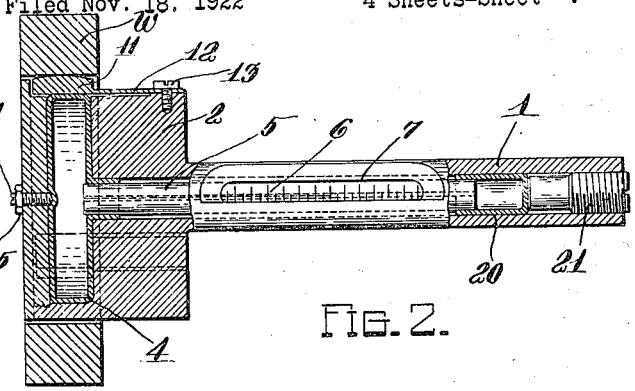
Fig.2.
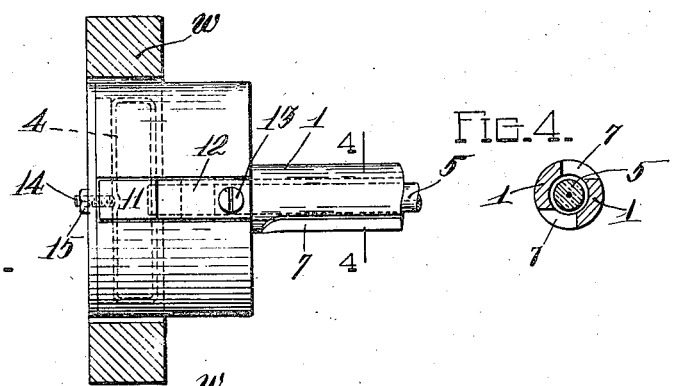
Fig.3.
Fig.4.
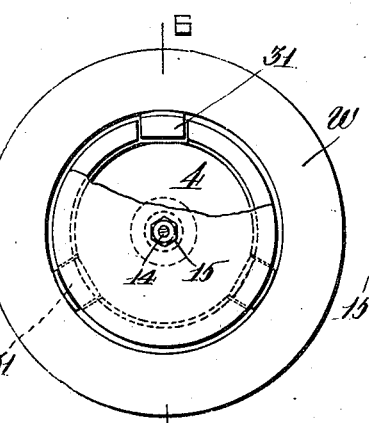
Fig.5.
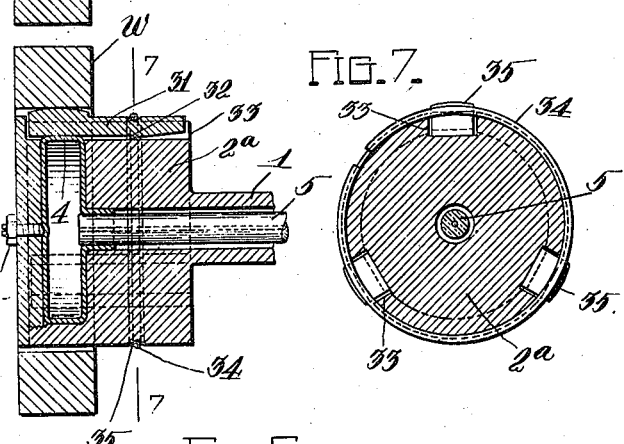
Fig.6.
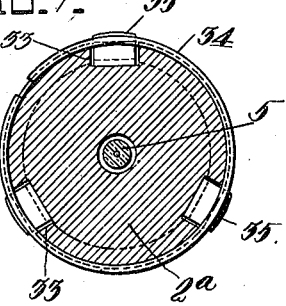
Fig.7.
INVENTOR
W. L. BRYANT.
ATTYS July 10, 1928.
W. L. BRYANT
1,676,248
MICROMETER GAUGE
Filed Nov. 18, 1922
4 Sheets-Sheet 2
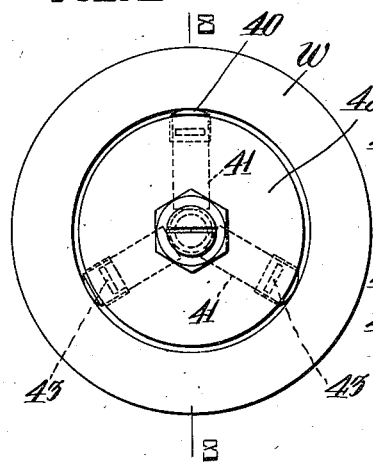
Fig.9
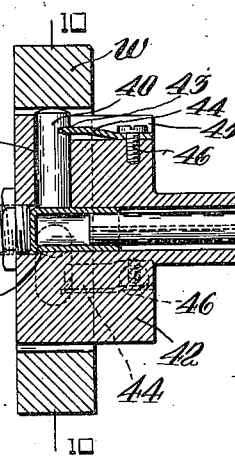
Fig.8
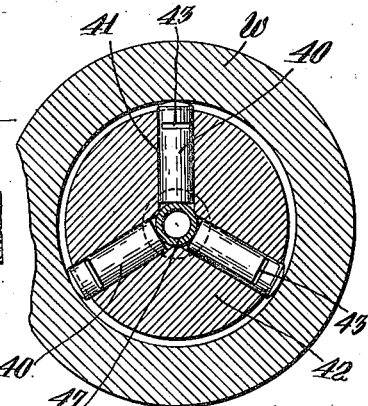
Fig.10
Fig.11
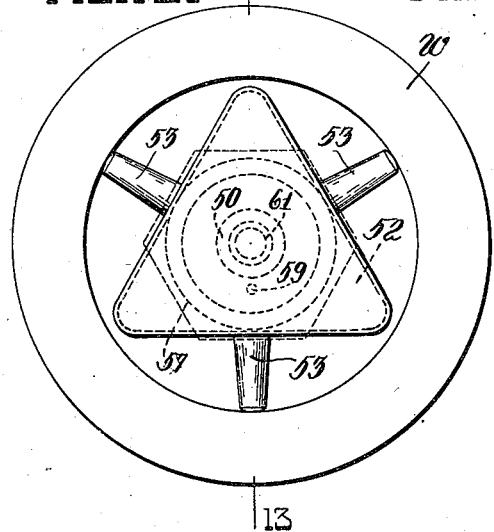
Fig.12
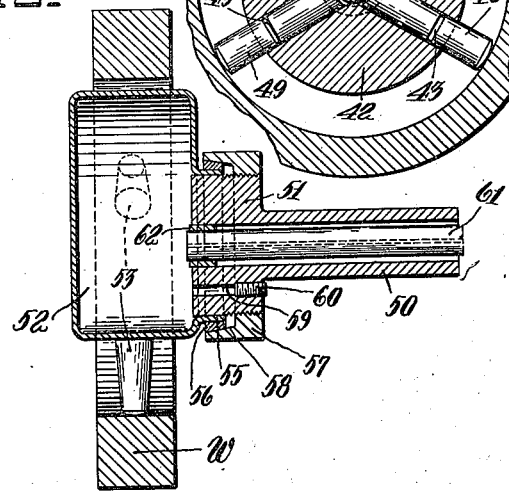
Fig.13
INVENTOR
W. L. BRYANT.
ATTYS July 10, 1928.

W. L. BRYANT

MICROMETER GAUGE

Filed Nov. 18, 1922

INVENTOR
W. L. BRYANT.

ATTYS

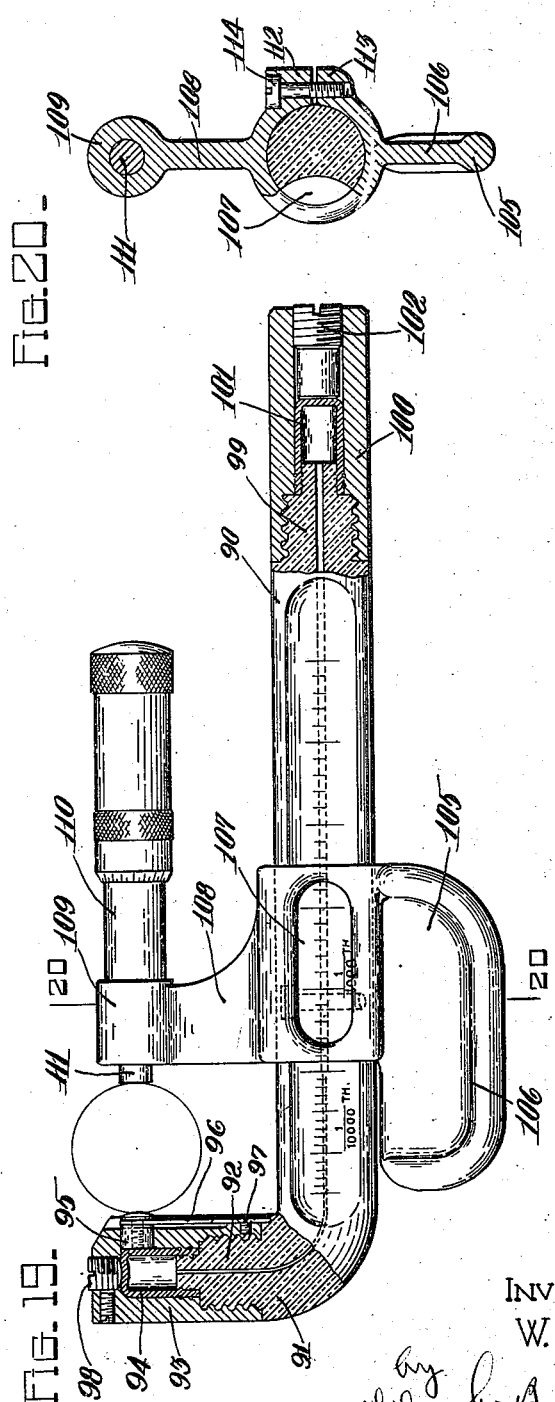

Patented July 10, 1928.

1,676,248

UNITED STATES PATENT OFFICE.

WILLIAM L. BRYANT, OF SPRINGFIELD, VERMONT.

MICROMETER GAUGE.

Application filed November 18, 1922. Serial No. 601,731.

This invention has relation to gauges, such for example, as are employed in measuring internal or external diameters.

The object of the invention is to provide a gauge of this general character which is provided with a fluid indicator so a workman in grinding or otherwise reducing a piece of work can determine from time to time the amount of stock to be removed and insure with exactness the desired ultimate dimension.

To this end this invention comprises a gauge having at least one movable element which may be engaged with the work and a graduated capillary tube containing a liquid column the length of which is controlled by the movement of said element by the work. Preferably this element bears against a yieldable reservoir or bulb for the liquid connected to one end of the tube, whereas the other end of the tube is connected with a gas reservoir or bulb so that as the column of liquid is extended or contracted in the tube by varying pressure on the first mentioned bulb or reservoir, provision is made for the flow of gas into or out of the tube at the other end thereof. The invention is capable of a variety of embodiments. It may take the form of gauges for determining or measuring either internal diameters or external or "outside" diameters, and in addition each form of gauge may be made in many different ways, some of which are illustrated on the annexed drawings. For example, but without limitation thereto, the graduations or scale may be located either on the tube or on a holder therefor and as the bore of the tube may be larger at one portion of its length than at another, with the scale properly related thereto, so that variations in dimensions as the diameter of the work approaches that desired, may be magnified on that portion of the scale adjacent the smaller bore portion of the tube. Moreover many structural changes may be made to fit the instrument for particular uses. In the accompanying drawings, Figure 1 shows an end elevation of a gauge embodying the invention and illustrates the same as introduced into the bore of a ring to measure the same.

Figure 2 represents a longitudinal section through the gauge, part being shown in side elevation.

Figure 3 is a side of that end of the instrument which carries the movable work-engaging elements.

Figure 4 represents a cross section on the line 4—4 of Figure 3.

Figure 5 is an end elevation.

Figure 6 a longitudinal section on the line 6—6 of Figure 5 and

Figure 7 a transverse section on the line 7—7 of Figure 6 of another form of instrument differing somewhat from that shown in Figures 1 to 4.

Figures 8, 9, 10 and 11 illustrate another form of the invention, Figure 8 representing a longitudinal section on the line 8—8 of Figure 9, Figure 9 representing an end view, Figure 10 a section on line 10—10 of Figure 8, and Figure 11 a section similar to Figure 10, but showing longer work-engaging elements.

Figure 12 is an end view showing a further modification.

Figure 13 is a section on line 13—13 of Figure 12.

Figures 14, 15:
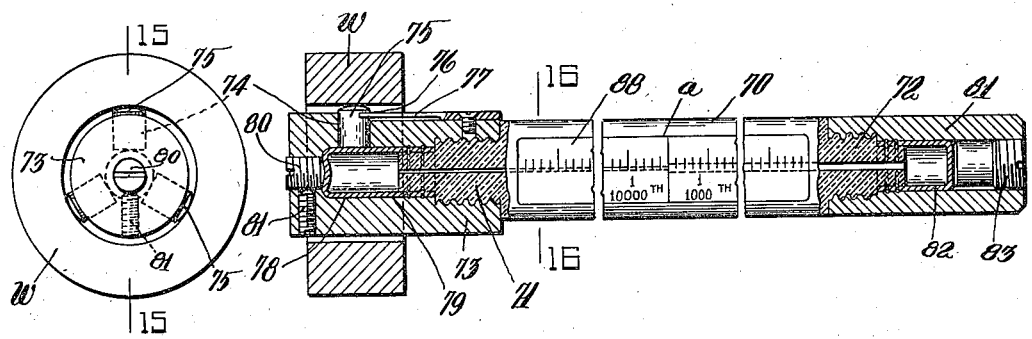
Figure 16:
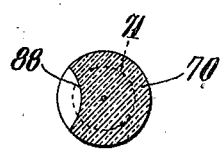

Figures 14, 15, and 16 represent an instrument in which the bore of the tube is formed with different diameters at different portions thereof, Figure 14 being an end view, Figure 15 representing the instrument partly in side elevation and partly in section on the line 15—15 of Figure 14, and Figure 16 being a cross section on the line 16—16 of Figure 15.

Figure 17:
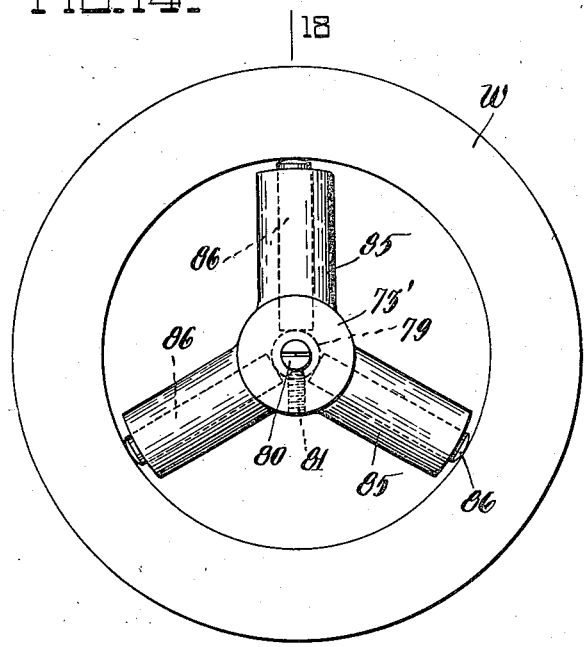
Figure 18:
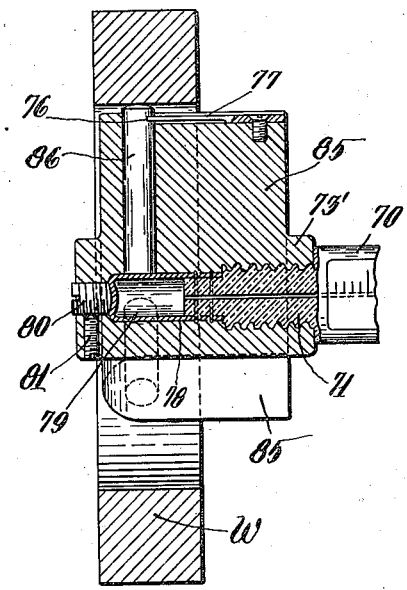

Figures 17 and 18 show a modified form of the last mentioned instrument, Figure 18 being a section on the line 18—18 of Figure 17.

Figure 19 shows an instrument partly in side elevation and partly in section and which likewise embodies the invention.

Figure 20 is a section on line 20—20 of Figure 19.

Referring first to the form shown in Figures 1 to 4 inclusive, 1 represents a substantially cylindrical holder or handle having at one end an enlarged head portion 2. This head is recessed to receive a flexible walled liquid reservoir 4 which may, if desired, be of rubber or similar material. Extending through the portions 1 and 2 and communicating at one end with the reservoir 4 is a capillary tube 5 which is graduated as shown at 6, openings 7 being made through the portion 1 opposite the graduations so that a considerable length thereof may be visible. The portion 2 is recessed at spaced points as at 10 and has positioned at each of these recesses, elements such as 11, adapted to be engaged with the inner faces of the work to be measured. These portions as shown have resilient shanks extending therefrom by which they may be fixed in position on the supporting portion 2 by means of fastening elements such as screws 13. The outer faces of these work-engaging elements are rounded to engage the work to be measured while their inner faces engage the periphery of the reservoir 4. The reservoir is adapted to be completely filled with a liquid which extends into the capillary tube to form a liquid column therein. When the elements 11 are pressed inwardly, as by means of the work to be measured wedging inwardly their outer rounded faces, they exert a pressure against the reservoir 4 compressing the same to a greater or less extent depending on the internal dimension of the work and forcing more or less of the liquid within the capillary tube, thus effecting a corresponding change in the position of the outer end of the column. As the diameter of this tube is small compared with the volume of liquid displaced by movement of the elements 11, the measurement of the length of this liquid column is an accurate indication of the amount of movement of these elements and correspondingly of the diameter of the work. In order that the length of the column may be initially adjusted so that its end may register with the desired graduation, a screw 14 may be threaded through the portion 2 and bear at its inner end against the wall of the reservoir 4. By adjusting this screw the effective initial volume of the reservoir may be adjusted and the end of the liquid column be correspondingly moved in the capillary tube. This screw may be fixed in adjusted position by any suitable means such as a lock nut 15 threaded thereon.

In order to provide means for retaining the column in unbroken formation regardless of the position in which the instrument is to be used, means for exerting air or gas pressure against the end of the column opposite to the reservoir 4 is provided. This means may consist of a reservoir or bulb 20 communicating with the outer end of the tube and preferably seated within the portion 1. This bulb should also be of resilient material such as rubber whose effective volume may be varied readily as by means of a screw plug 21 threaded in the outer end of the portion 1 and bearing at its inner end against the bulb 20. With this construction the liquid column has its end face acted on by gaseous pressure.

In use this instrument is inserted in the hole the diameter of which is to be measured and which is slightly less than the normal outward position of the work-engaging faces of elements 11 so that these elements are forced inwardly and effect a lengthening of the liquid column. When the work which is shown at $w$ is finished to the proper diameter the end of the column will register a definite value in the graduations. While three movable elements 11 for engaging the work spaced angularly from each other are shown in this embodiment, one or more might be used as might be found desirable in any particular instance. At least two is regarded as preferable in most cases since the work may be measured more accurately than with one. With the use of three, however, it is possible to test for roundness by rotating the instrument within the opening and observing any fluctuations in the column length as the instrument successively takes various angular positions relative to the work.

In Figures 5, 6, and 7 a slightly different method of mounting the work-engaging elements is shown. In this form each element comprises a lever 31 having a fulcrum rib 32 which bears against the outer face of the portion $2^a$ corresponding to the portion 2 of the form first described, this lever being preferably seated in a slot 33 therein. The inner face of one end of this lever bears against the pressure reservoir 4 and its outer rounded face is adapted to bear against the work in the same manner as in the first form described, the elements 31, however, rocking about the fulcrum 32 as their ends are brought toward each other against the liquid reservoir by engagement with the work. These elements may be held in position by any suitable means, as shown a ring of wire 34 engageable in slots 35 in their outer faces opposite to the fulcrum ribs and surrounding the portion $2^a$ being employed for this purpose. In this form also three work-engaging elements are shown.

Figures 8, 9, 10, and 11 illustrate a further modification in which the work engaging elements are not formed as levers, but are in the form of pins or rods 40 having rounded outer work-engaging ends and which are slidably mounted in radial openings 41 in the support 42, each element 40 being provided with a slot 43 for the reception of one end of a leaf spring 44 positioned within a slot 45 in the portion 42 and held at its opposite end thereto by means of a screw 46. In this form the liquid reservoir is in the form of a bulb 47 of smaller diameter than the reservoir 4 of the construction heretofore described, but the elements 40 bear thereon at their inner ends and function in the same way as the work-engaging elements above described. The normal capacity of the reservoir or bulb 47 may be varied as by means of a screw 48 threaded through the portion 42 and bearing thereon. In place of the rods 41 longer rods as shown at 49 in Figure 11 may be employed where work of greater diameter is to be gauged, the mechanism otherwise being the same as shown in Figures 8, 9, and 10, these rods 49 also having slots 43 for engagement with the springs 44.

In Figures 12 and 13 another form of mechanism is shown in which the handle portion of the instrument housing the capillary tube shown at 50 terminates in a flange 51 to which is made fast a reservoir 52 which may be triangular in cross section and have projecting from its sides work-engaging pins 53 which may be brought into engagement with the work in the same manner as the work-engaging elements of the forms previously described. The walls of the reservoir 52 are, of course, made flexible so that the pins 53 may yield inwardly as the gauge is placed in position, the reservoir being made preferably of metal. For the purpose of holding this reservoir in position it may be flanged as shown at 55, a packing ring 56 may be placed thereover and the whole sealed to the portion 51 by means of a nut 57 having a conical flange 58 extending over the packing ring. At 59 is shown an opening normally closed by a plug 60 and through which liquid may be placed within the reservoir 52. Extending through the portion 50 and sealed thereto as by a packing ring 62 is a capillary tube 61 which opens at its end within the reservoir 52.

In Figures 14 and 15 still another form of instrument is shown in which the capillary tube itself forms the handle portion. This tube, which is indicated at 70, has its extremities reduced and threaded as shown at 71 and 72. The portion 71 has screwed thereon a hollow cap 73 designed to be inserted within the work and which slidably carries in radially arranged openings 74 therein work-engaging pins 75, each of which may, if desired, have a slot 76 within which the end of a leaf spring 77 may engage to hold it in position similar to the pins 41 and 49 of the form shown in Figures 9 to 11. The cap 73 also has an axial opening 78 in alinement with the tube 70 for the reception of the liquid reservoir 79 which is in communication with the bore of the tube, the elements 75 bearing at their inner ends against the outer wall of this reservoir. Here again in order to initially position the end of the liquid column within the capillary tube, an adjusting screw 80 may be employed bearing against the end face of the reservoir, this screw being fixed in adjusted position by means of a set screw 81. The end 72 of the tube 70 may have engaged thereon a cap 81 which houses a gas reservoir 82 communicating with the bore of the capillary tube, the capacity of which may be adjusted by means of the adjustable plug 83 threaded in the outer end of the cap 81 and bearing thereon. In this form of the instrument one portion of the length of the capillary tube, as from a point $a$ to the gas reservoir 82, is shown as of larger diameter than the portion from $a$ to the liquid reservoir 78, the graduations being correspondingly spaced in the two portions. It will be noted that the larger portion of the bore is toward the outer end of the capillary tube in which will be registered sizes of work appreciably smaller than the desired finished work at which time an accurate indication of the amount of stock to be removed is not particularly essential. As the diameter of the work approaches more nearly to the correct finished size, the end of the liquid column passes within the smaller diameter bore at which time a small change in the diameter to be measured will effect a considerable change in the length of the liquid column, so that a magnification of size changes over that produced when the end of the column as in the portion of larger diameter is produced, that is, with equal increments of size change a larger change in length of the column is produced as the work approaches its finished size than when the work is further from that size.

In Figures 17 and 18 a slight further modification is shown in which the plug 73' has radial projecting sleeves 85 thereon which are bored to receive work-engaging pins 86 of considerably greater length than the pins 75. This modification is employed for work of greater internal diameter than that shown in Figures 14 and 15, the construction otherwise being identical. Where the capillary tube forms the handle for the instrument the graduations may be placed on a cut-out portion 88 therein as shown in Figures 15 and 16.

In Figures 19 and 20 a form of the invention is shown adapted to measuring outside diameters. In these figures the handle portion of the instrument is formed by means of a capillary tube 90 one end of which as at 91 is bent to extend at right angles to the main portion of the tube. This bent portion has its end 92 threaded for the reception of a cylindrical housing 93 adapted to contain the liquid reservoir 94 against which impinges the inner end of a work-engaging pin 95. This pin may be held in position by means of a leaf spring 96 engaging it at one end and made fast at its opposite end at 97 to the portion 93. In this form also a threaded plug 98 may be employed to adjust the initial length of the liquid column in the capillary tube 90. The opposite end of this capillary tube is reduced as shown at 99 for engagement with a cap 100 which houses the gas reservoir 101 and in the end of which is threaded the adjusting plug 102. Slidably mounted on the main portion of the capillary tube is a bracket member 105 having a handle portion 106 and an opening 107 therethrough through which the graduations on the capillary tube may be observed. Opposite the handle portion 106 this member has an outwardly extending web 108 at the end of which is an eye 109 for the reception of a micrometer screw 110. The inner end of this screw is formed as an abutment 111 which is positioned opposite to the pin 95, the pin and the portion 111 forming the two work-engaging elements of a pair of outside calipers. The bracket 105, as shown in Figure 20, is formed split, the slit portions 112 and 113 being adapted to be brought together for clamping the bracket in any desired position lengthwise of the tube by means of a screw 114. This form of my invention is set forth and claimed specifically in my divisional application Serial No. 41,553, filed July 6, 1925, for micrometer gauges.

In the use of this form of the instrument the bracket is adjusted as close as possible to the desired position to bring the elements 95 and 111 the proper distance apart. The micrometer screw 110 is then adjusted so that the end of the liquid column will be in a convenient position when the proper size of work has been reached. In this form also is shown the idea of employing a capillary tube having two sizes of internal diameter the end of the liquid column appearing in the portion of smaller diameter as the correct finished size of the work is approached so that the accuracy of the instrument may be made greater at that time.

Having thus described certain embodiments of this invention, it should be evident that many changes and modifications might be made therein without departing from its spirit or scope as defined by the appended claims.

I claim:

1. In a measuring instrument, elements engageable with an object to be measured, a liquid column, and a flexible walled liquid reservoir in communication with said column and against which each of said elements engages, whereby the relative positions of said elements when in engagement with said object are indicated by the length of said column.

2. In a measuring instrument, elements engageable with an object to be measured, a liquid column, a flexible walled liquid reservoir in communication with one end of said column and against which each of said elements engages, and means for maintaining the liquid filling said reservoir and in an unbroken column extending therefrom to maintain the indication of said column correct regardless of the position of said instrument in use.

3. In a measuring instrument, a plurality of elements relatively movable to engage a cylindrical wall at angularly spaced points, a flexible walled liquid reservoir against which each of said elements press, and a graduated capillary tube extending from said reservoir to indicate by the length of the liquid column therein the diameter of said wall.

4. In a measuring instrument, a movable element for engaging an object to be measured, a flexible walled liquid reservoir against which said element is pressed by said object, a graduated capillary tube in communication with said reservoir to contain a liquid column extending from said reservoir, a gas pressure reservoir in communication with the opposite end of said tube, and means for adjusting the capacity of said gas reservoir to adjust the pressure exerted on said column.

5. In an instrument for measuring internal diameters, a plurality of elements arranged to bear on the internal surface of the object to be measured, a flexible walled liquid reservoir against which each of said elements engages, and a graduated capillary tube extending from said reservoir to indicate by the length of the liquid column therein the internal diameter of the object to be measured.

In testimony whereof I have affixed my signature.

WILLIAM L. BRYANT.